United States Patent [19]

Benda

[11] Patent Number: 5,173,916
[45] Date of Patent: Dec. 22, 1992

[54] OPTICALLY PULSED LASER HAVING COUPLED ADJOINT BEAMS

[75] Inventor: John A. Benda, Amston, Conn.

[73] Assignee: United Technologies Corporation, Hartford, Conn.

[21] Appl. No.: 780,637

[22] Filed: Oct. 23, 1991

[51] Int. Cl.⁵ .................................................. H01S 3/08
[52] U.S. Cl. .......................................... 372/92; 372/18; 372/10; 372/97; 372/99; 372/93
[58] Field of Search .................. 372/10, 18, 20, 25, 372/30, 92, 95, 96, 103, 99, 97, 98, 93

[56] References Cited

U.S. PATENT DOCUMENTS

| | | | |
|---|---|---|---|
| 3,921,096 | 11/1975 | Chenausky et al. | 372/95 |
| 4,025,172 | 5/1977 | Freiberg | 372/95 |
| 4,164,366 | 8/1979 | Sziklas et al. | 372/95 |
| 4,429,400 | 1/1984 | Kaye | 372/98 |
| 4,514,850 | 4/1985 | Holmes et al. | 372/95 |
| 4,516,244 | 5/1985 | Holmes | 372/95 |
| 4,682,339 | 7/1987 | Sziklas et al. | 372/95 |
| 4,766,393 | 8/1988 | Johnson | 372/95 |
| 4,841,541 | 6/1989 | Sziklas et al. | 372/95 |
| 5,012,483 | 4/1991 | Reintjes et al. | 372/95 |
| 5,079,772 | 1/1992 | Negus et al. | 372/92 |

Primary Examiner—Brian Healy
Attorney, Agent, or Firm—McCormick, Paulding & Huber

[57] ABSTRACT

An optically pulsed laser with an unstable resonator configuration is described with two feedback beams. The laser relies on adjoint mode feedback with a single modulator in the low power feedback beam path. The laser is characterized by a two coupled adjoint feedback beams each configured to pass through the modulator in one direction only, thereby doubling the output power potential of the laser.

17 Claims, 4 Drawing Sheets

OPTICALLY PULSED LASER HAVING COUPLED ADJOINT BEAMS

TECHNICAL FIELD

The present invention relates generally towards lasers and more particularly towards high powered lasers having coupled adjoint feedback beams.

CROSS REFERENCE TO RELATED APPLICATIONS

Some of the subject matter hereof is disclosed and claimed in the following commonly owned, copending U.S. patent applications which are incorporated herein by reference: "A High Powered Laser With Reduced Optical Aberration", Ser. No. 781,771, pending; "A High Power Laser Having Staged Laser Adjoint Pulsed Feedback", Ser. No. 780,897, (pending); "A Mode-locked High Power Laser Having An Adjoint Feedback Beam", Ser. No. 780,898, pending; "Pulsed Ring Lasers Using Adjoint Coupling Control", Ser. No. 781,431, pending; "Optically Pulsed Laser", Ser. No. 781,430; "Linear Polarization Control of High Power Lasers", Ser. No. 781,426, pending; "Improved Linear Polarization Control of High Power Lasers", Ser. No. 781,427; and "Circular and Elliptical Polarization of a High Power Laser by Adjoint Feedback", Ser. No. 781,428, pending.

BACKGROUND OF THE INVENTION

High powered lasers used for welding or drilling are well known in the art. Typically, these lasers, such as the 14 kilowatt model laser marketed by the Industrial Laser Division of United Technologies Corporation, are of the transverse electrode, convective flow type. In these lasers, large volumes of carbon dioxide gas or an equivalent gaseous lasing medium are flowed through a region of opposed electrodes. A gas discharge is created between the electrodes, creating the population inversion that is needed to generate a high powered, coherent beam.

Adjoint feedback has been found to be a way of controlling the operation of a laser. Adjoint feedback consists of taking a portion of the output of a laser and retroreflecting it back into the adjoint mode (the converging wave) of the resonator or, in the case of coupling, injecting it into the adjoint mode of another laser. The advantage of using an adjoint feedback beam is that it is a small low power beam which is not part of the main resonator. Optics in the adjoint feedback beam can be readily changed or rotated. A laser embodying the same is disclosed and claimed in a commonly owned, co-pending U.S. patent application entitled "Optically Pulsed Laser", Ser. No. 781,430, pending incorporated herein by reference.

Pulsing of high power industrial lasers has a number of potential applications, such as paint stripping. The potential for suppression of the plasma which forms on a metal target also may give improved welding, hole drilling, and cutting performance. Also, the higher peak power which is potentially achievable with pulsed operation may allow welding and cutting of metals which are now difficult, such as aluminum and copper. A technique for Q-switching using adjoint feedback beam with an unstable resonator is disclosed and claimed in the copending, commonly owned U.S. patent application entitled "Optically Pulsed Laser", filed on even date and incorporated herein by reference.

The useful power range for these lasers is limited by the power limit of the chopper or modulator. The power limits constraining modulators are more severe. However, modulators offer many advantages, including more abrupt opening and closing times, higher repetition rates, and the potential for tailoring optical pulse shapes. Commercially available modulators for $CO_2$ laser radiation are limited to optical beams of about 100 W of average power.

It would be advantageous to have a high powered laser of the aforementioned type characterized by adjoint feedback that is capable of operating at very high power. The present invention is drawn towards such a laser.

SUMMARY OF THE INVENTION

An object of the present invention is to provide a pulsed laser having coupled adjoint feedback beams each of which passes through a beam modulator in only one direction.

Another object of the present invention is to provide a laser having adjoint feedback capable of operation at very high power.

According to the present invention, a laser includes an optical cavity disposed along an optic axis and an excitation means adjacent to said optical cavity extending along a portion of an optic axis. A gain medium is located in the optical cavity for receiving excitation signals from the excitation means and providing optical gain to a cavity optical beam transiting therethrough. The laser further includes a resonator assembly positioned within the optical cavity including a first cavity mirror positioned at a first end of the optical cavity, a scraper mirror positioned within the optical cavity to receive an optical beam transiting therein and turn a portion of the cavity optical beam outward from the optical cavity. The scraper mirror has a central aperture along the optic axis as well as first and second feedback apertures displaced from the optic axis about respective feedback axes. A second cavity mirror is opposed to the first cavity mirror at a second end of the optical cavity along the optic axis and is registered with the central aperture to reflect the cavity optical beam within the optical cavity. First and second feedback mirrors are located along the feedback axes for guiding first and second feedback beams between the first and second feedback apertures. A pulsing apparatus is positioned along a one of the feedback axes to receive the feedback beams and, in response to control signals, provide thereto a perturbation in optical loss incurred by the feedback beam transiting said optical cavity.

DESCRIPTION OF THE PREFERRED EMBODIMENT

Figure 1:
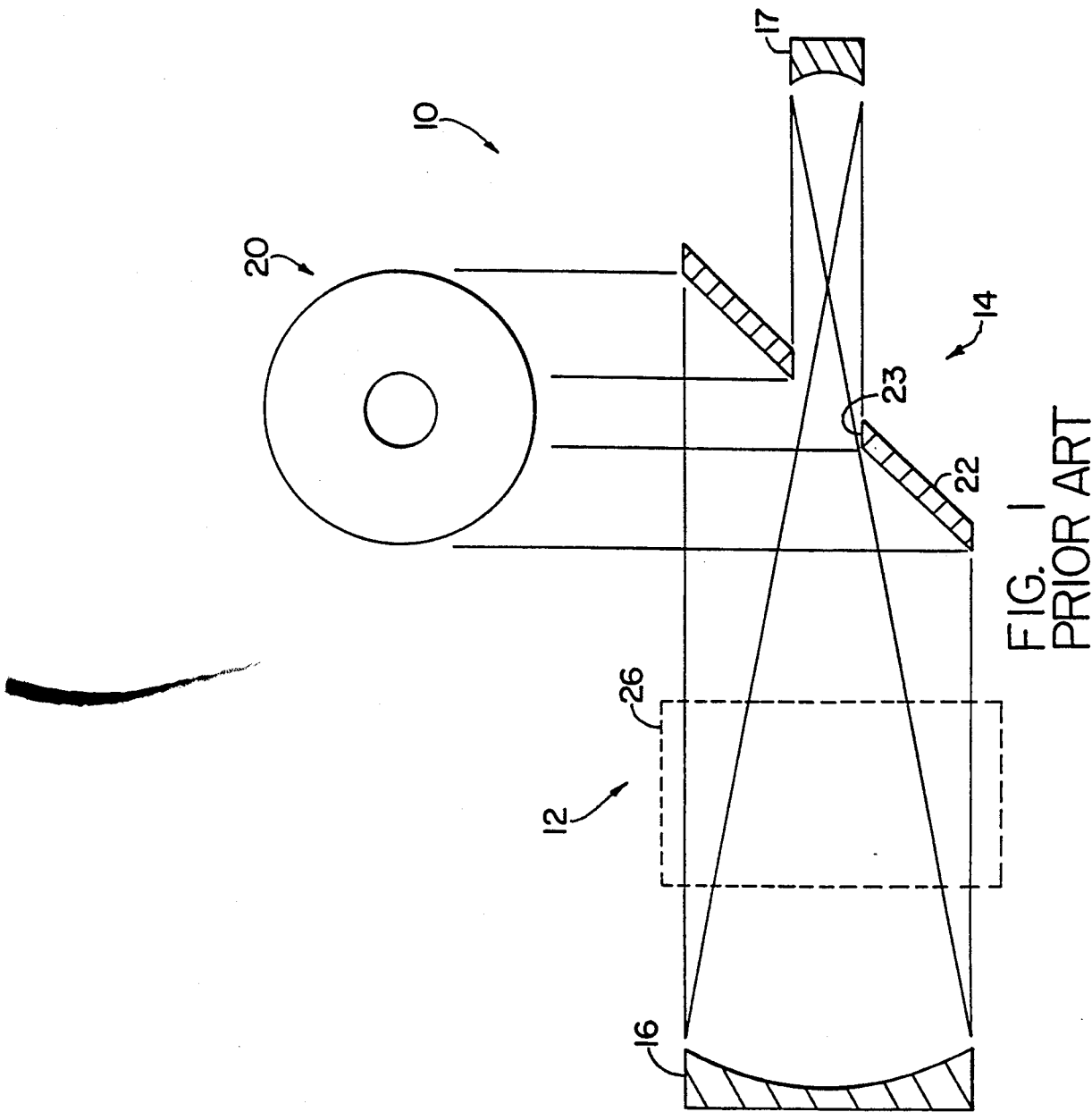
FIG. 1 is a simplified schematic illustration a laser of the prior art having adjoint beam feedback.

FIG. 1 is a simplified illustration showing a laser of the prior art having an adjoint beam feedback. The laser 10 is comprised of a resonator assembly 12 that bounds an optical cavity 14. The resonator assembly includes primary cavity mirrors 16 and 17. A collimated output beam 20 is presented from the laser by a scraper mirror 22. The scraper mirror has a central aperture 23 allowing the optical beam to transit between the cavity mirrors. The resonator assembly shown in laser 10 is of the negative branch, unstable confocal resonator type.

In the past, attempts to generate a pulsed output beam by Q switching or modelocking required the insertion of an apparatus 26 into the resonator assembly to intercept the optical beam within the assembly to selectively control cavity loss. Unfortunately, for high power applications the simple insertion of an element into the main resonator assembly is unacceptable because of the high flux that will be seen by the element. Consequently, prior art devices have an inherent upper bound to their output power.

Figure 2:
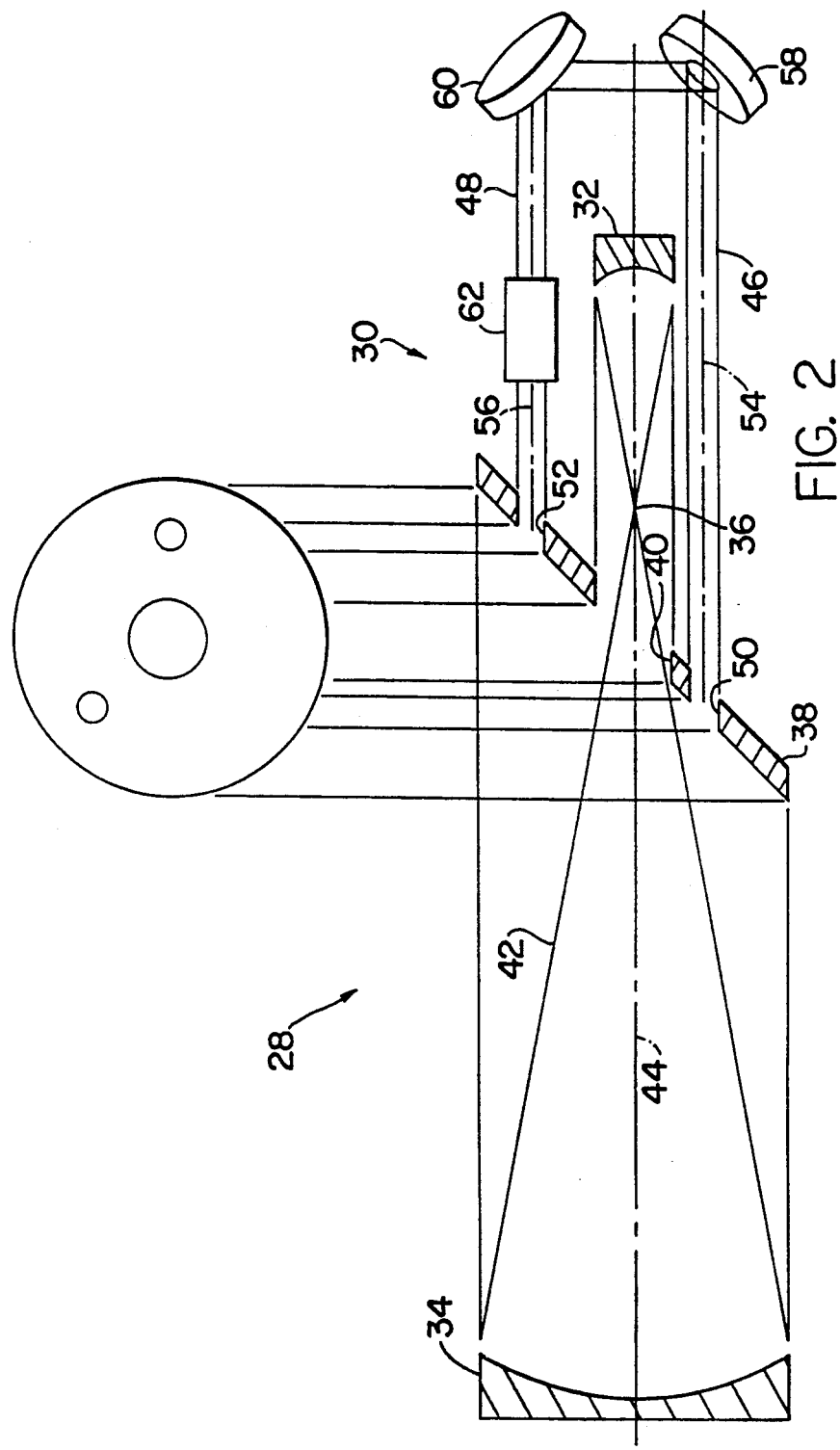
FIG. 2 is a simplified illustration of a laser provided by the present invention.

Referring now to FIG. 2 there is shown a high powered laser 28 provided in accordance with the present invention. The laser is characterized by an adjoint feedback beam and displays pulsed, high power operation. The laser employs a confocal unstable resonator assembly 30 of the negative branch type. The resonator assembly is comprised of cavity mirrors 32 and 34 whose foci (f) 36 substantially coincide and are located within the cavity. Those skilled in the art will note that other resonator assembly geometries such as a positive branch confocal unstable resonator assembly may be equivalently substituted.

The gain medium (not shown) in the optical cavity used with the laser 28 is typically a gas such as a known mixture of carbon dioxide, nitrogen and helium. Those skilled in the art will recognize that other gases can be equivalently substituted and a variety of electrode configurations can be used depending upon the power output and other desired laser parameters. The laser 28 can operate continuously (CW) in a known manner. A description of known components such as the electrodes for gas excitation have been omitted for purposes of clarity. Further, those skilled in the art will note that the present invention includes lasers having a non-gaseous gain medium, such as solid state lasers.

The laser 28 also includes a scraper mirror 38 having a central aperture 40 for passing a cavity beam 42 between the cavity mirrors along an optic axis 44. The laser 28 is characterized by first and second feedback beams 46, 48 passed through corresponding feedback apertures 50, 52 along first and second feedback axes 54, 56 to adjoint feedback mirrors 58, 60. Disposed between one of the feedback mirrors and the scraper mirror aperture is an element 62 such as a chopper or modulator (acousto-optic or electro-optic).

The feedback beams are reflected back to the resonator assembly 30 in a particular configuration of a direction phased distribution such that it is mode matched to the adjoint mode of the resonator. A definition of "adjoint mode" is given in "Orthogonality Properties of Optical Resonator Eigenmodes", Optics Comm., Vol. 31, pp. 369-373, Dec. 1979. The reflected radiation walks into the axis of the resonator, making several passes before diffractively spreading and contributing to resonator loss or output. The effect of this is to reduce the resonator loss more than by other means of injecting the feedback beam, thus allowing a low power beam to have a large effect.

The output beam is collimated so it is necessary simply to retroreflect the output beam with a flat mirror. For non-collimated output, a curved mirror will be necessary to mode match the adjoint mode of the resonator. In general, the compound resonator eigenvalue $\gamma c$ for a resonator assembly is given approximately by $$\gamma c = \frac{1}{M} + \frac{A_c}{\lambda f_1} \quad (1)$$

where $A_c$ is the area of the adjoint feedback aperture area being for the feedback beam; $\lambda$ is the laser wavelength and $f_1$, is the focal length of the cavity mirror 32. The first term in equation (1) is the contribution of the parent resonator self-feedback to the eigenvalue and the second term is the contribution of the feedback of the adjoint beam. The power feedback is proportional to $$\gamma c = \frac{1}{M^2} + \frac{2A_c}{\lambda M f_1} + \frac{A_c}{\lambda f_1} \quad (2)$$

The equivalent or compound resonator has a feedback value that is greater than the parent resonator. The third term in equation (2) is often negligible. Since the cavity loss is proportional to $(1-\gamma^2)$, the change in $\gamma$ above means that the cavity loss has substantially decreased and therefore, for these operating conditions, that the circulating power has substantially increased.

The "leverage" effect from the use of adjoint feedback rather than non-adjoint feedback results from the fact that, in this type of unstable resonator, the adjoint is converging down to the resonator axis so that the radiation fed back in from an adjoint feedback beam makes several passes through the resonator, before spreading diffractively and contributing to the resonator losses, as it is reflected between the cavity mirrors 32 and 34. The adjoint feedback power thus makes many more passes through the gain medium than non-adjoint feedback would before significant loss occurs.

A laser provided according to the present invention allows the power handling capability of a single modulator to be doubled. The two feedback beams are routed into the other, with only one modulator in between. Each feedback beam passes through the modulator in only one direction, so the total power in the adjoint feedback beams can be double what it is in the embodiment of FIG. 1. The present invention includes other laser resonator geometries, including the ring resonators and standing wave resonators described and claimed in the commonly owned U.S. Pat. Nos. 4,682,339 and 4,841,541 and incorporated herein by reference.

Figure 3:
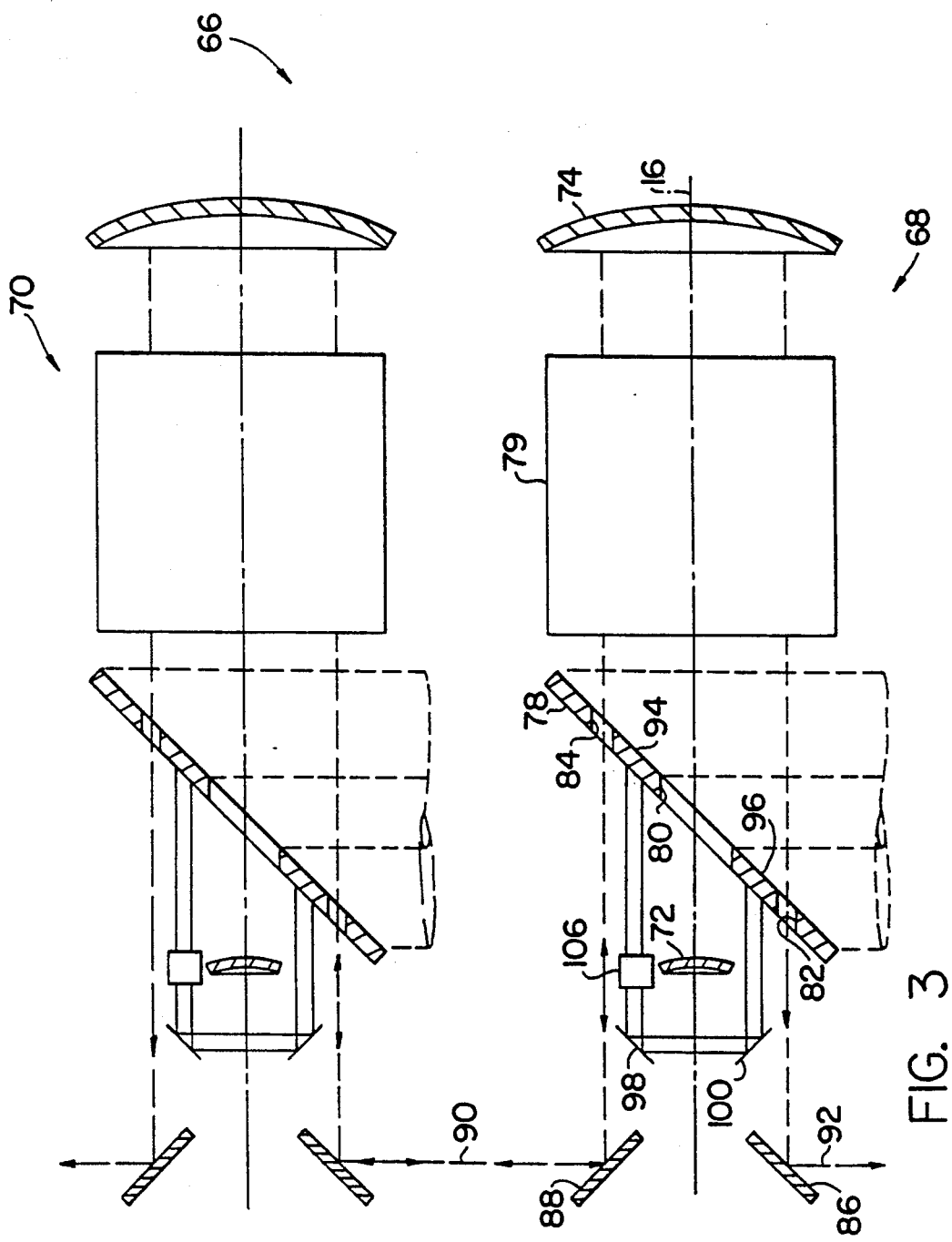
FIG. 3 is a simplified schematic illustration of a second laser provided according to the present invention.

FIG. 3 is a simplified schematic illustration of a first alternative laser 64 provided by the present invention. The first alternative laser comprises an array 66 of two unstable resonators 68 and 70. Resonator 68 further comprises a convex mirror 72, concave mirror 74 placed along axis 76 with an output coupling or scraping mirror 78. The means for pumping the lasing medium, flow apparatus (for a gas medium) and other aspects of the laser are conventional and are not shown for purposes of illustrative clarity. A laser array of the type described with respect to FIG. 3 is disclosed and claimed in the commonly owned U.S. Pat. No. 4,682,339 and is incorporated herein by reference. The second resonator 70 is identical to the first.

Within the central portion of the resonator 68, close to the axis 76, the radiation between the mirrors diverges gradually until it produces a collimated beam having a diameter of the concave mirror that is deflected by a scraping mirror 78. A gain medium is schematically shown at 79. The scraping mirror is a conventional mirror having a central aperture 80 sized to fit the convex mirror. Radiation diverging from the concave mirror will strike the back side of the scraper mirror and be deflected out of the cavity. Additional output coupling apertures 82, 84 are provided in the scraper mirror. Each of these apertures permits a small portion of the collimated output beam, which serves as coupling beams, to pass through the mirror and be deflected by turning mirrors 86 and 88. Beam 90 is coupled into the resonator 70 and beam 92 is coupled into an adjacent resonator above the resonator and not shown in the figure.

In the laser 64 each resonator is configured as is resonator 68 and is characterized by coupled adjoint feedback apertures 94, 96 and feedback mirrors 98 and 100. A modulator 106 is also included. The adjoint feedback beams transit through the respective modulators in the same manner as set forth hereinabove with respect to the laser of FIG. 2. In this manner, the laser array 68 provides coupled, pulsed output beams. Alternatively, the modulators can be placed in path 90.

Figure 4:
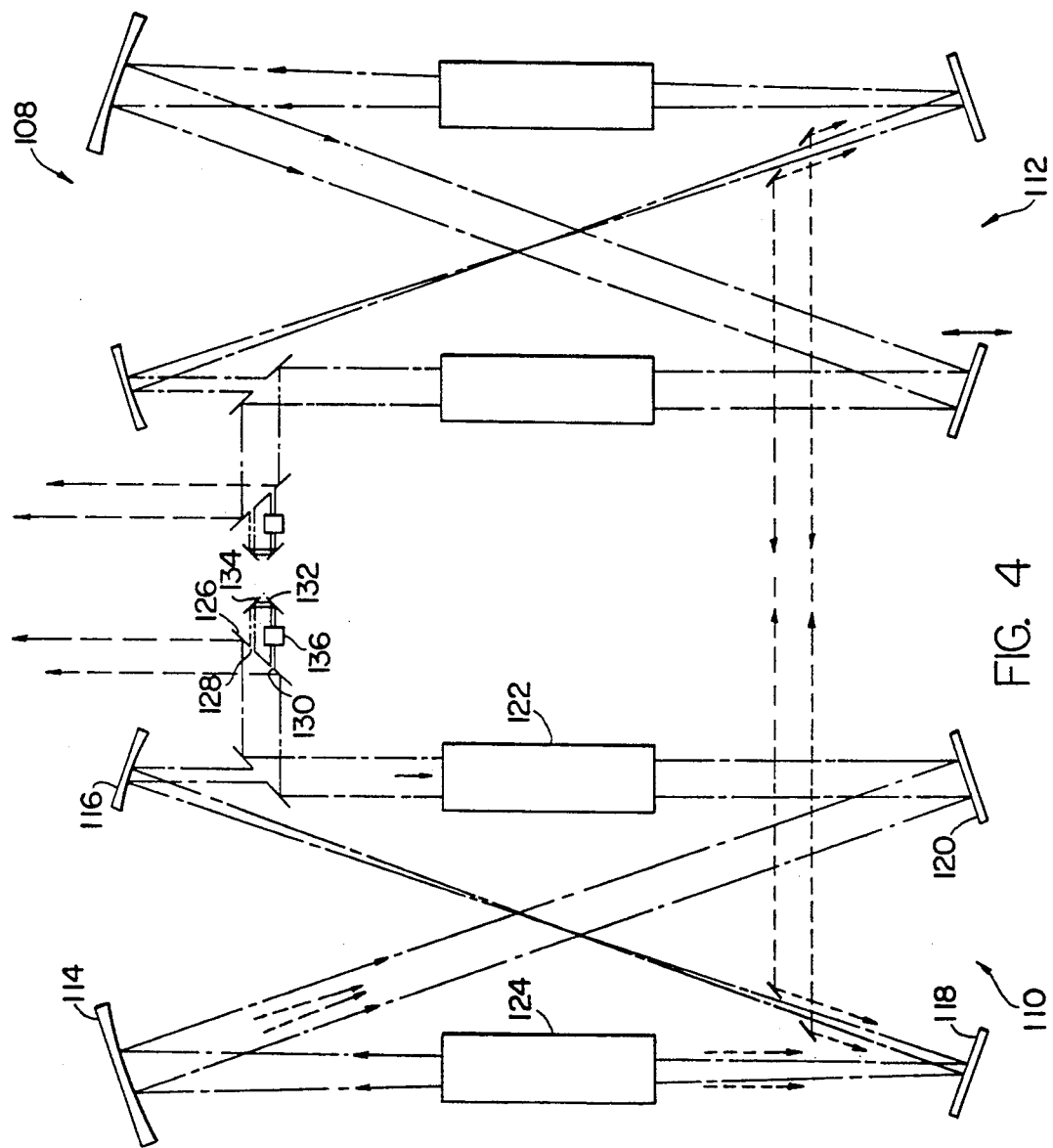
FIG. 4 is a simplified schematic illustration of a third laser provided according to the present invention.

FIG. 4 schematically illustrates a second alternative laser 108 provided in accordance with the present invention. The laser 108 comprises a pair of ring laser resonators 110 and 112 of the type disclosed and claimed in the commonly owned U.S. Pat. No. 4,841,541 and incorporated herein by reference. As detailed therein, radiation is generated into conventional modes, the forward mode and the reverse mode. The forward mode is collimated between a first curved mirror 114 and a second curved mirror 116. Flat mirrors 118 and 120 complete the basic set of mirrors. Gain media 122 and 124 provide optical gain to the beams circulating therein.

Resonator 112 is a mirror image of the aforementioned resonator with the difference that a flat mirror is manually adjustable in order to correct the path length of the resonator 112 to match that of resonator 110. The optical beams and the paths through which they traverse as well as the coupling between the resonators of the ring laser is accomplished in the manner as described in the '541 patent references above. In the laser 110 each resonator has a turning mirror 126 characterized by coupled adjoint feedback apertures 128, 130 and feedback mirrors 132 and 134. Modulator 136 is also included. The adjoint feedback beams transit through the respective modulators in the same manner as set forth hereinabove with respect to the laser of FIG. 2.

Similarly, although the invention has been shown and described with respect to a preferred embodiment thereof, it should be understood by those skilled in the art that various other changes, omissions and additions thereto may be made therein without departing from the spirit and scope of the present invention.

I claim:

1. A laser, comprising:
an optical cavity disposed along an optic axis;
excitation means adjacent to said optical cavity extending along a portion of an optic axis;
a gain medium located in said optical cavity for receiving excitation signals from said excitation means and providing optical gain to a cavity optical beam transiting therethrough; and
a resonator assembly positioned within said optical cavity including
a first cavity mirror positioned at a first end of the optical cavity;
a scraper mirror positioned within said cavity to receive an optical beam transiting therein and turning a portion of said cavity optical beam outward from said optical cavity, said scraper mirror having a central aperture along said optic axis and first and second feedback apertures displaced from said optic axis about respective feedback axes;
a second cavity mirror opposed to said first cavity mirror at a second end of the optical cavity along said optic axis registered with said central aperture configured to reflect said cavity optical beam within said optical cavity;
first and second feedback mirrors located along said feedback axes for guiding first and second feedback beams between said first and second feedback apertures; and
a pulsing means positioned along a one of said feedback axes to receive said feedback beams and, in response to control signals, provide thereto a perturbation in optical loss incurred by said feedback beams transiting said optical cavity, thereby generating a pulsed output beam.

2. The laser of claim 1 wherein said pulsing means further comprises a modelocking device.

3. The laser of claim 1 wherein said pulsing means comprises a modulator.

4. The laser of claim 3 wherein said modulator further comprises a cavity "Q" switching device.

5. The laser of claim 3 wherein said modulator comprises a chopper.

6. The laser of claim 1 wherein said first cavity mirror has a focus therein located along said optic axis within said optical cavity and wherein said second cavity mirror has a focus therein substantially at said first mirror focus; said first and second cavity mirrors configured to invert said optical beam transiting therebetween.

7. The laser of claim 1 wherein said first cavity mirror has a focus located along said optic axis outside of said optical cavity and wherein said second cavity mirror has a focus substantially at said first cavity mirror focus.

8. The laser of claim 1 wherein said gain medium comprises a gas.

9. The laser of claim 8 wherein said laser is of the transverse electrode convective flow type.

10. The laser of claim 9 wherein said excitation means comprises a cathode electrode having a series of "L" shaped elements extending into said gas.

11. The laser of claim 8 wherein said gas is flowed between said electrodes at a velocity of approximately Mach 0.3.

12. The laser of claim 8 wherein said gas comprises carbon dioxide gas.

13. A laser, comprising:
an optical cavity disposed along an optic axis;
excitation means adjacent to said optical cavity extending along a portion of an optic axis;
a gain medium located in said optical cavity for receiving excitation signals from said excitation means and providing optical gain to a cavity optical beam transiting therethrough; and
a resonator assembly positioned within said optical cavity including
a first cavity mirror positioned at a first end of the optical cavity;
a scraper mirror positioned within said cavity to receive an optical beam transiting therein and turning a portion of said cavity optical beam outward from said optical cavity, said scraper mirror having a central aperture along said optic axis and first and second feedback apertures displaced from said optic axis about respective feedback axes;

a second cavity mirror opposed to said first mirror at a second end of the optical cavity along said optic axis registered with said central aperture configured to reflect said cavity optical beam within said optical cavity;

optical turning means for guiding feedback beams from respective ones of said feedback apertures through the other of said feedback apertures; and a pulsing means positioned along a one of said feedback axes to receive said feedback beam and, in response to control signals, provide thereto a perturbation in optical loss incurred by said feedback beam transiting said optical cavity;

said optical turning means configured such that said feedback beams each transit said pulsing means in only one direction.

14. A laser comprising:

a first ring laser resonator having a first gain medium means for establishing an inverted population state in a first gain medium;

a first set of mirrors in a ring configuration for resonating, in predetermined radially diverging forward and reverse modes and predetermined radially converging adjoint reverse and adjoint forward modes, radiation in a first ring path passing through said gain medium, said radiation in said forward and adjoint forward modes travelling in a predetermined forward direction about said ring path and said radiation in said reverse and adjoint reverse modes travelling about said first ring path in a reverse direction opposite to said forward direction, said adjoint forward mode being adjoint to said forward mode and said adjoint reverse mode being adjoint to said reverse mode;

first outcoupling means for extracting radiation travelling in said forward mode in said first ring path from said first ring path;

internal coupling means for coupling a predetermined coupling fraction of said radiation in one of said forward and reverse modes into a first predetermined radially converging mode adjoint to the other of said forward and reverse modes and travelling about said first ring path in a direction opposite to that of said one of said forward and reverse modes, whereby said radiation in said first predetermined radially converging mode converges radially and couples into said other of said forward and reverse modes;

means for coupling into said ring path a second predetermined amount of external coupling radiation into a predetermined radially converging mode adjoint to said one of said forward and reverse modes, whereby said external coupling radiation into a predetermined radially converging mode adjoint to said one of said forward and reverse modes, whereby said external coupling radiation converges radially and couples in phase said one of said forward and reverse modes and said one of said forward and reverse modes, so that all of said predetermined modes of said ring laser resonator are coupled in phase to said external coupling radiation;

a one of said first set of mirrors having first and second feedback apertures for receiving a portion of said radiation in said first and second modes and providing therethrough first and second feedback beams along corresponding first and second feedback axes;

first and second feedback mirrors located along said feedback axes for guiding first and second feedback beams between said first and second feedback apertures; and a pulsing means positioned along a one of said feedback axes to receive said feedback beams and, in response to control signals, provide thereto a perturbation in optical loss incurred by said feedback beams transiting said optical cavity, thereby generating a pulsed output beam.

15. A laser having at least two independently pumped unstable laser resonators, each having a feedback region in which optical radiation resonates, an output region in which output radiation exits from said output region in which output radiation exits from said feedback region and an output coupling means for coupling out a main beam from said output region in which laser extracted radiation extracted from a first one of said at least two unstable laser resonator influences said at least one other unstable laser resonator, wherein the improvement comprises a system in which each of said resonators is mutually and substantially symmetrically, bidirectionally coupled to said at least one other unstable resonator, through extraction means for extracting at least one coupling portion of said output radiation having, in total, a coupling radiation power and transporting means for transporting said at least one coupling portion of said output radiation that is mode-matched to an adjoint mode of said at least one other unstable laser resonator into at least one corresponding output region of said other one of said at least two unstable laser resonators to produce a laser system having a scaled-up laser output, each of said resonators further having a feedback means associated with said extraction means including a mirror having first and second feedback apertures for receiving a portion of said radiation and providing therethrough first and second feedback beams along corresponding first and second feedback axes with first and second feedback mirrors located along said feedback axes for guiding first and second feedback beams between said first and second feedback apertures and a pulsing means positioned along a one of said feedback axes to receive said feedback beams and, in response to control signals, provide thereto a perturbation in optical loss incurred by said feedback beams transiting said optical cavity, thereby generating a pulsed output beam.

16. The laser of claim 6 wherein said first and second mirror foci do not coincide.

17. The laser of claim 7 wherein said first and second mirror foci do not coincide.

* * * * *